Dec. 5, 1950
J. A. D. Y. RAPP
2,533,044
CABLE DISTRIBUTION SYSTEM
Filed May 24, 1948
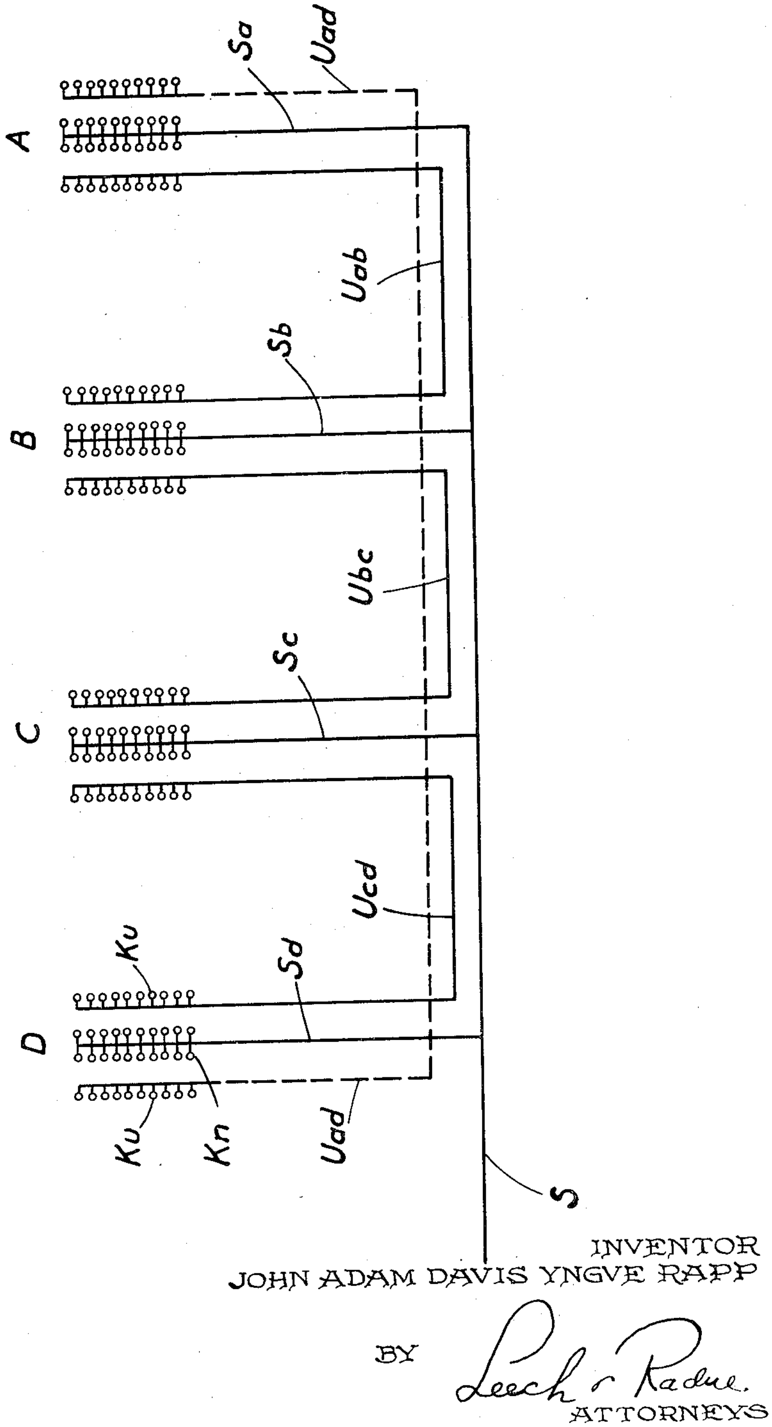
INVENTOR
JOHN ADAM DAVIS YNGVE RAPP
BY Leech & Radue.
ATTORNEYS Patented Dec. 5, 1950 2,533,044

UNITED STATES PATENT OFFICE 2,533,044

CABLE DISTRIBUTION SYSTEM

John Adam David Yngve Rapp, Stockholm, Sweden, assignor to Telefonaktiebolaget L M Ericsson, Stockholm, Sweden, a company of Sweden Application May 24, 1948, Serial No. 28,893
In Sweden June 5, 1947

2 Claims. (Cl. 179—98)

The invention relates to an arrangement for increased utilisation of a network and refers especially to a telephone network or the like. Such a network generally consists of primary cables outgoing from the exchange and usually forking to certain interconnecting points, so called distribution cabinets. From said distribution cabinets, secondary cables lead to the spreading points from which the distribution lines are directly connected to the subscribers. There is at each spreading point a certain number of spare connections, to which new subscribers are connected. In order not to be obliged to increase too often the number of the pairs of conductors in the secondary cables, these spare connections at the spreading points, i. e. the number of pairs which are drawn from the secondary cable to the connection boxes of the spreading points must be rather large, which means high costs for the secondary cable plant. In an arrangement according to the present invention, the cost for the plant is lower due to the fact that the same reserve at the spreading points can be obtained with a smaller number of connections to the secondary cable. This is achieved in that the spreading points are arranged in groups and that special equalisation lines are arranged between the spreading points within a group.

The invention will be described more closely with reference to the accompanying drawing, which schematically shows a group comprising four spreading points A, B, C, D geographically bordering each other, which group is connected to a secondary cable S.

Each spreading point is directly connected by means of its contacts *Kn* to S over a cable *Sa*, *Sb*, *Sc* and *Sd* respectively, each with for example 10 pairs of conductors. That part of S, which provides for the direct connections to A, B, C and D thus comprises

| | Pairs |
|---|---|
| Between A and B | 10 |
| Between B and C | 20 |
| Between C and D | 30 |
| Between D and the feeding point | 40 |

Besides the direct connections from S to the spreading points said points are connected between themselves by their contacts *Kn* so that each one of them is connected with two others over equalisation lines *Uav*, *Ubc*, *Ucd* and *Uad*. The last mentioned equalisation line (dotted on the drawing) is in the present embodiment only projected to be carried out under certain circumstances, i. e. if the geographic distance between A and D is not too long. As appears from the drawing, the equalisation lines are connected at the spreading points by means of 10 terminals and thus comprise 5 pairs each. If the equalisation line A—D is carried out, the secondary cable S will, along the dotted line A—D, comprise 10 pairs more than the direct lines require according to what has been mentioned above.

If all the direct lines have been used at a spreading point, for example B, and it is necessary to connect a further number of subscribers at said point, and there are spare connections at C (or A or D), an interconnection is made at C between the terminals of the direct line *Sc* and those of the equalisation line *Ubc*. The new subscribers at B can thereafter be connected to *Ubc* and are thus in connection with the exchange over the spreading point C. Thus, not only their own spare connections are available at each spreading point, but also the spare connections of two or more other spreading points, owing to which the number of spare connections to the secondary cable for each spreading point can be much smaller than would be necessary without equalisation lines. The utilisation of the secondary cable network thus increases by 15–30%, which means, that the largest part of the compensating functions of the distribution cabinet is removed to the spreading points. Owing thereto, the expensive distribution cabinets can be omitted. The secondary cables are instead drawn to certain so called feeding points in the network, to which according to need cables can be drawn and connected to the exchange. Owing to the compensation possibilities between the spreading points created through the equalisation lines, it is not necessary to connect at once all the spreading points to the exchange, but only a certain number of them which depends upon the most urgent need. The subscribers in the spreading points not connected to the exchange are then, to begin with, supplied through the equalisation lines from a nearby spreading point.

I claim:

1. An arrangement for the increased utilization of a network of the telephone type comprising in combination, an exchange feeding point, a cable extending from said exchange feeding point, a plurality of geographically bordering spreading points, subscriber lines for connection to said cable through said spreading points, a branch extending from said cable to each spreading point and comprising a predetermined number of pairs to include a number of spares for future subscribers, and equalization lines extending from each spreading point to other spreading points and containing pairs for making use of spares of a spreading point adjacent one where none remains available.

2. An arrangement for the increased utilization of a network of the telephone type comprising in combination, an exchange feeding point, a cable extending from said exchange feeding point, a plurality of spreading points arranged in groups, subscriber lines for connection to said cable through said spreading points, a branch extending from said cable to each spreading point in a group and having a predetermined number of conductor pairs to initially include a number of spares for future subscribers, equalization lines each containing less than the number of pairs in a branch, at least one equalization line connecting each spreading point to another spreading point within the same group whereby unused spares at one spreading point may be used by another when necessary.

JOHN ADAM DAVID YNGVE RAPP.

REFERENCES CITED

The following references are of record in the file of this patent:

UNITED STATES PATENTS

| Number | Name | Date |
|---|---|---|
| 979,676 | Lademan | Dec. 27, 1910 |
| 1,067,606 | Gronvigh | July 15, 1913 |
| 1,541,926 | Davidson | June 16, 1925 |
| 1,758,919 | Arndt | May 20, 1930 |
| 2,283,057 | Hagen | May 12, 1942 |
| 2,406,002 | Deakin | Aug. 20, 1946 |